(12) United States Patent
Duan et al.

(10) Patent No.: US 7,969,675 B2
(45) Date of Patent: Jun. 28, 2011

(54) DETERMINATION OF THE QUALITY OF AN ERASE PROCESS FOR PERPENDICULAR MAGNETIC RECORDING DISKS

(75) Inventors: Shanlin Duan, Fremont, CA (US); Zhupei Shi, San Jose, CA (US); Jane Jie Zhang, San Jose, CA (US); Kezhao Zhang, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 207 days.

(21) Appl. No.: 12/266,950

(22) Filed: Nov. 7, 2008

(65) Prior Publication Data

US 2010/0118423 A1 May 13, 2010

(51) Int. Cl.
G11B 27/36 (2006.01)
G11B 5/03 (2006.01)

(52) U.S. Cl. .......................................... 360/31; 360/66

(58) Field of Classification Search ....................... None
See application file for complete search history.

(56) References Cited

U.S. PATENT DOCUMENTS

| 7,079,345 | B1 * | 7/2006 | Nguy et al. | 360/66 |
| 7,589,924 | B2 * | 9/2009 | Yoshizawa | 360/31 |

\* cited by examiner

Primary Examiner — Daniell L Negrón
Assistant Examiner — Regina N Holder
(74) Attorney, Agent, or Firm — Duft Bornsen & Fishman, LLP

(57) ABSTRACT

Methods and test systems are disclosed for determining the quality of an erase process for perpendicular magnetic recording (PMR) disks. After performing an erase process on a PMR disk and before the PMR disk is assembled into a hard disk drive, a first test pattern of magnetization pulses is written to a region of the PMR disk. A second test pattern is subsequently read from the region of the PMR disk. The second pattern of magnetization pulses is analyzed in relation to the first test pattern and measured to determine the quality of the erase process.

12 Claims, 10 Drawing Sheets

DETERMINATION OF THE QUALITY OF AN ERASE PROCESS FOR PERPENDICULAR MAGNETIC RECORDING DISKS

BACKGROUND OF THE INVENTION

1. Field of the Invention

The invention is related to magnetic storage devices, and in particular, to determining the quality of an erase process for perpendicular magnetic recording (PMR) disks.

2. Statement of the Problem

Of the many magnetic storage devices, the hard disk drive is the most extensively used to store data. Hard disk drives may include a number of different types of hard disk recording media. One type of hard disk recording media used in hard disk drives is longitudinal magnetic recording. In longitudinal recording, the axis of magnetization is oriented parallel with the underlying hard disk substrate. In another type of recording media, called perpendicular magnetic recording, the axis of magnetization is oriented perpendicular to the underlying hard disk substrate. During the manufacturing of the hard disk drive, hard disks are fabricated and then bulk erased using a variety of processes, such as insertion of the hard disks into a magnetic tunnel. The erase process is designed to pre-condition and prepare the disk for subsequent magnetic recording. Different types of pre-conditioning are desired depending on the recording media used. In a PMR disk, an alternating magnetic field state (AC erased state) is desired. A high quality erase process of the PMR disk before assembly is an important consideration in the manufacturing process, as it directly affects the final manufacturing yield of the hard disk drive. Portions of the disk which contain non-alternating magnetic field states (DC erased states) can saturate the read head in the hard disk drive, which results in distorted servo signals from the read heads and reduced hard disk drive yield.

One previous method of determining the quality of the erase process of the PMR disk before assembly involves optical testing of the surface of the PMR disk. In optical testing, a PMR disk is visually inspected under magnification to detect specific visual patterns. Based on the patterns, the quality of the erase process is inferred. One problem with optical testing is that it is not very reliable in determining the erase state of the PMR disk. After the erase process, the PMR disk is assembled into the hard disk drives. Hard disk drives which fail a post-assembly erase quality test require a lengthy in-drive erase process, which is time consuming and expensive to the manufacturing process.

SUMMARY

Embodiments of the invention provide improved systems and methods for determining the quality of an erase process for perpendicular magnetic recording (PMR) disks before the PMR disks are assembled into hard disk drives. One or more test patterns of magnetic pulses are written to a PMR disk after an erase process and before assembly into a hard disk drive. Subsequently, one or more test patterns of magnetic pulses are read from the PMR disk and analyzed to determine the quality of the erase process. Determining the quality of the erase process for the PMR disk before assembly increases manufacturing yield and avoids the need for a post-assembly in-drive erase process.

In one embodiment of the invention, a method of determining the quality of an erase process for PMR disks is disclosed. According to the method, an erase process is performed on the PMR disk before assembly into a hard disk drive. A first test pattern of magnetization pulses is written to one or more regions of the PMR disk. A second test pattern of magnetization pulses is subsequently read from the regions of the PMR disk. After reading the second test pattern, the second test pattern is analyzed in relation to the first test pattern. The quality of the erase process is determined based on the analysis of the second test pattern of magnetization pulses read from the PMR disk.

In another embodiment of the invention, a test system for determining the quality of an erase process for PMR disks is disclosed. The test system includes a spin-stand operable to receive a PMR disk. The PMR disk mounted in the spin stand has been erased using the erase process being evaluated. The test system further includes a disk tester. The disk tester is operable to write a first test pattern of magnetization pulses to regions of the PMR disk. The disk tester is further operable to subsequently read a second test pattern of magnetization pulses from the regions of the PMR disk. The disk tester is further operable to analyze the second test pattern of magnetization pulses in relation to the first test pattern. The disk tester is further operable to determine the quality of the erase process being evaluated based on the analysis of the second test pattern of magnetization pulses read from the PMR disk.

The invention may include other exemplary embodiments as described below.

DESCRIPTION OF THE DRAWINGS

The same reference number represents the same element or same type of element on all drawings.

DETAILED DESCRIPTION OF THE INVENTION

FIGS. 1-15 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
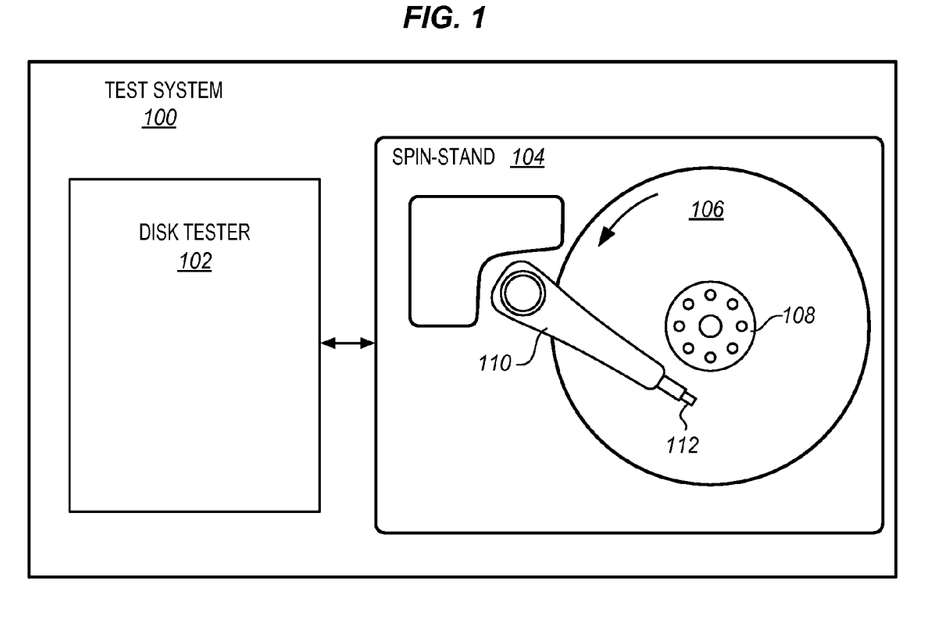
FIG. 1 illustrates a test system for determining the quality of an erase process for PMR disks in an exemplary embodiment of the invention.

FIG. 1 illustrates a test system 100 for determining the quality of an erase process for a PMR disk in an exemplary embodiment of the invention. Test system 100 includes a spin-stand 104 operable to receive PMR disk 106 on a spindle 108 and to rotate PMR disk 106 in the direction indicated by the arrow. Spin-stand 104 also includes an actuator arm 110 and a test head 112. Actuator arm 110 moves test head 112 radially across the surface of PMR disk 106 to position test head 112 within regions of PMR disk 106. After test head 112 is in position, test patterns are read from and written to PMR disk 106 by test head 112. Test system 100 also includes a disk tester 102. Disk tester 102 is operable to communicate with spin-stand 104 for writing and reading magnetic pattern data to and from PMR disk 106 using test head 112. Disk tester 102 is also operable to determine the quality of the erase process used to erase PMR disk 106 based on the magnetic pattern data read from PMR disk 106. Disk tester 102 may comprise any number of hardware and software components, test assemblies, or other equipment operable to carry out functions to determine the quality of the erase process used to erase PMR disk 106.

After fabricating PMR disk 106, PMR disk 106 is erased using various processes including inserting PMR disk 106 into a magnetic tunnel. Erasing PMR disk 106 organizes magnetic domains within PMR disk 106 into a desired orientation. In some cases however, erasing PMR disk 106 produces regions of magnetic domains which are not organized in the desired orientation. Disks which are not erased correctly exhibit distorted readback signals after assembly into a hard disk drive, which reduces manufacturing yields.

Figure 2:
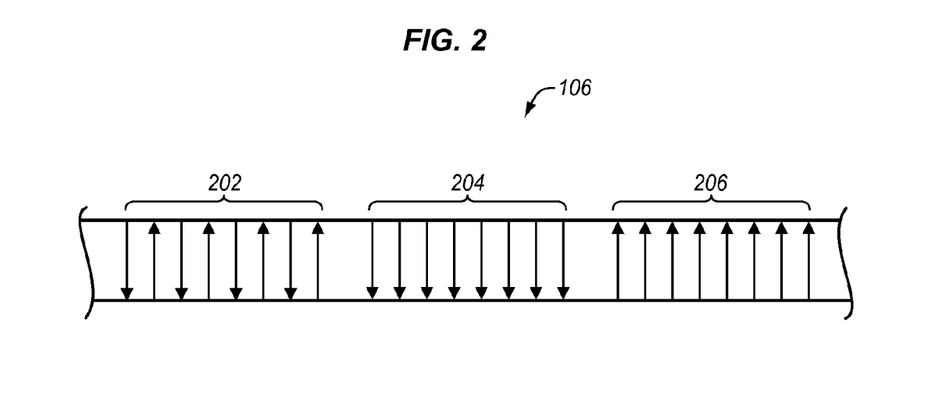
FIG. 2 is a side view illustrating magnetic regions of a PMR disk after the erase process.

FIG. 2 is a side view illustrating magnetic regions of PMR disk 106 after the erase process. Region 202 indicates a region on PMR disk 106 which has been erased to a desired orientation. In region 202, magnetic domains (indicated by arrows) alternate in orientation. Regions 204 and 206 indicate magnetic regions on PMR disk 106 which have not been erased to a desired orientation. In regions 204 and 206, magnetic domains do not alternate in orientation. Because regions 204 and 206 do not alternate in orientation, they may cause a magnetic bias on PMR disk 106 within regions 204 and 206. For purposes of illustration only, regions 204 and 206 will specify a negative magnetic bias and a positive magnetic bias, respectively, for PMR disk 106. The magnetic bias within regions 204 and 206 cause distorted readback signals when PMR disk 106 is assembled into a hard disk drive. The distorted readback signals caused by regions 204 and 206 interact with read heads in the hard disk drive which reduce the manufacturing yield of a hard disk drive assembled using hard disks similar to PMR disk 106.

Figure 3:
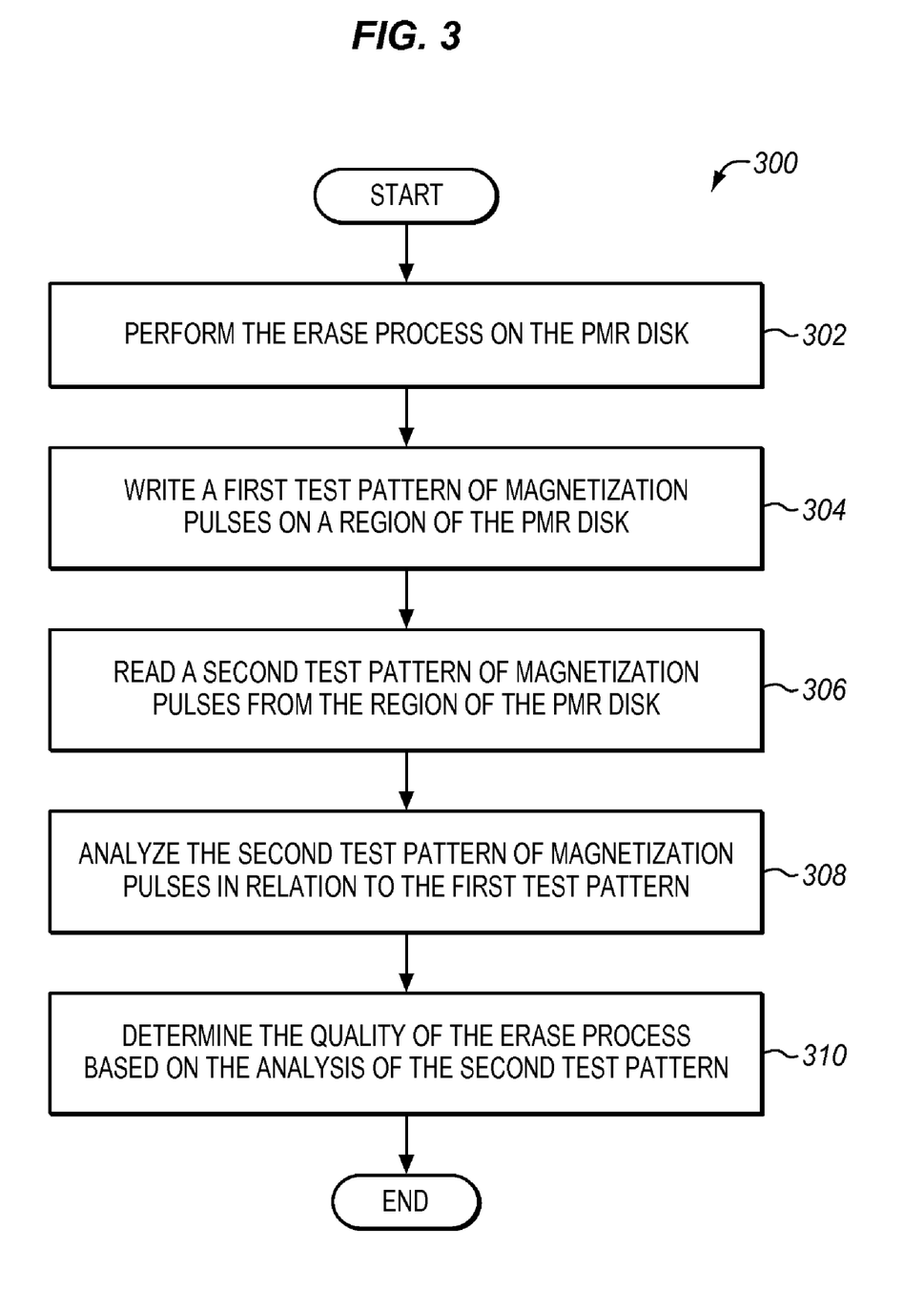
FIG. 3 is a flow chart illustrating a method of determining the quality of an erase process performed on a PMR disk in an exemplary embodiment of the invention.

FIG. 3 is a flow chart illustrating a method 300 for determining the quality of an erase process performed on PMR disk 106 in an exemplary embodiment of the invention. The steps illustrated in method 300 are not all inclusive and may include other steps not shown. For illustration purposes only, method 300 will be described with reference to test system 100 of FIG. 1.

Step 302 of method 300 includes performing an erase process on PMR disk 106. Based on the quality of the erase process performed, PMR disk 106 may include any number of alternating and non-alternating magnetic domains indicated by regions 202-206 (see FIG. 2).

In step 304, disk tester 102 writes a first test pattern of magnetization pulses on one or more regions of PMR disk 106. Magnetic patterns written to PMR disk 106 may include, but are not limited to, asymmetric magnetic pulses, square wave magnetic pulses, and the like.

In step 306, disk tester 102 reads a second test pattern of magnetization pulses from the regions of PMR disk 106 previously written by disk tester 102 in step 304. Based on the quality of the erase process performed in step 302, the second test pattern read in step 306 may be different than the first test pattern written in step 304.

In step 308, disk tester 102 analyzes the second test pattern of magnetization pulses in relation to the first test pattern. In some cases, disk tester 102 may measure the amplitudes of the second test pattern to qualify the differences between the first test pattern written and the second test pattern read. One skilled in the art will recognize that any number of measurements may be made on the second test pattern when qualifying the differences between the first test pattern written in step 304 and the second test pattern read in step 306.

In step 310, disk tester 102 determines the quality of the erase process performed in step 302 based on the analysis of the second test pattern performed in step 308. Based on the quality of the erase process performed in step 302, the second test pattern may be different than the first test pattern. For example, if PMR disk 106 includes non-alternating magnetic domains similar to regions 204 and 206 of FIG. 2, then the second test pattern read in step 306 may be substantially different than the first test pattern written in step 304. When measuring the second test pattern in step 308, the differences between the first test pattern and the second test pattern may be more readily qualified as being substantial. In this example, the quality of the erase process performed in step 302 is low. Conversely, if PMR disk 106 includes alternating magnetic domains similar to region 202 of FIG. 2, then the second test pattern read in step 306 may be substantially the same as the first test pattern written in step 304. When measuring the second test pattern in step 308, the differences between the first test pattern and the second test pattern may be more readily qualified as being not substantial. In this example, the quality of the erase process performed in step 302 is high.

One skilled in the art will recognize that any number of patterns may be written by disk tester 102, some examples of which are described below. One skilled in the art will recognize that while specific patterns and embodiments are discussed below, the invention is not limited to any specific pattern.

Figure 4:
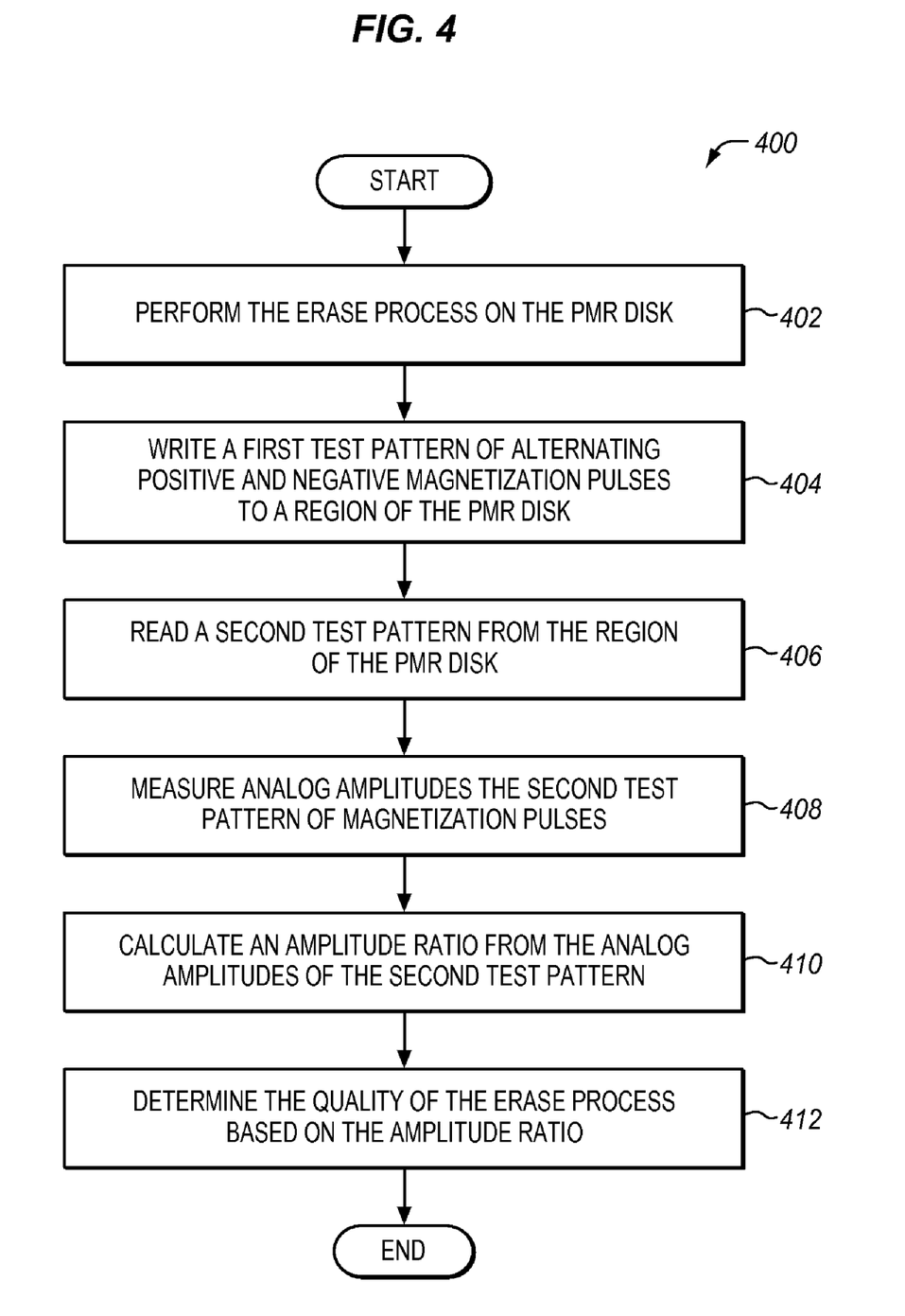
FIG. 4 is a flowchart illustrating a method of determining the quality of an erase process for a PMR disk in an exemplary embodiment of the invention.

FIG. 4 is a flowchart illustrating a method 400 for determining the quality of an erase process performed on PMR disk 106 in an exemplary embodiment of the invention. The steps of method 400 are not all inclusive and may include other steps not shown. For illustration purposes only, method 400 will be described with reference to test system 100 of FIG. 1.

Figure 5:
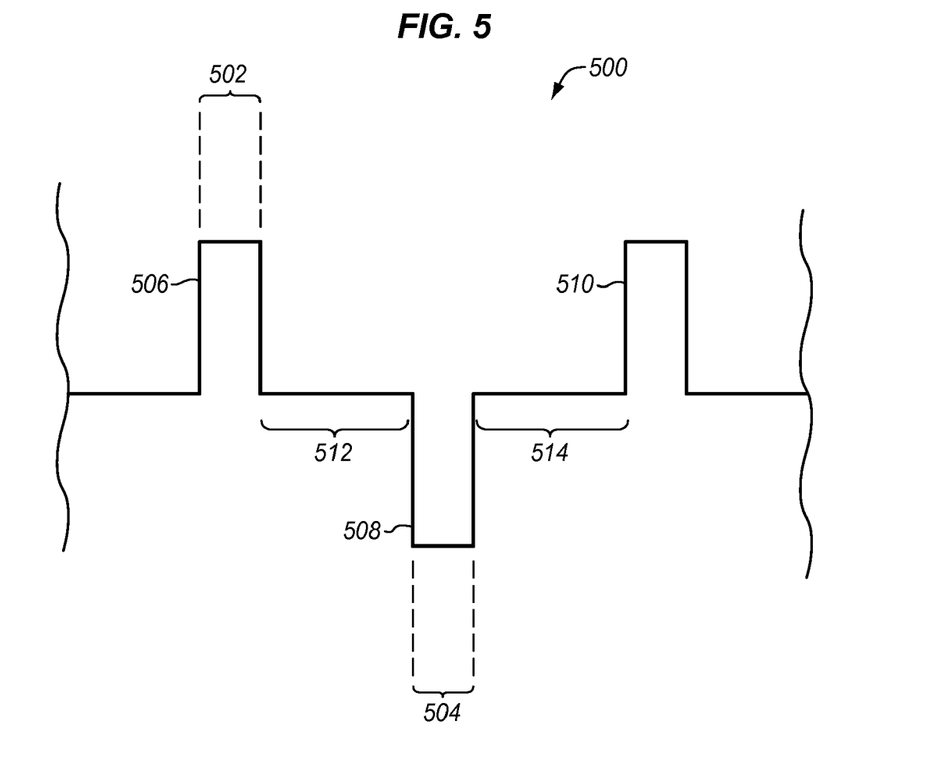
FIG. 5 is an illustration of a first test pattern of magnetization pulses written according to a step of the method of FIG. 4 in an exemplary embodiment of the invention.

Step 402 of method 400 includes performing the erase process on PMR disk 106 before assembly into a hard disk drive. In step 404, disk tester 102 writes a first test pattern of alternating positive and negative magnetization pulses to one or more regions of PMR disk 106. FIG. 5 is an illustration of a first test pattern 500 of magnetization pulses written by disk tester 102 according to step 404 in an exemplary embodiment of the invention. First pattern 500 written by disk tester 102 includes alternating positive and negative magnetic pulses 506, 508, and 510 which may have pulse widths 502 and 504 of about 50 nanoseconds. Regions 512 and 514 between alternating pulses 506, 508, and 510 may be about 100 nanoseconds in duration. Based on pulse widths 502 and 504, and regions 512 and 514, the period of first test pattern 500 may be about 300 nanoseconds.

In step 406, disk tester 102 reads a second test pattern from the one or more regions written in step 404. Depending on the quality of the erase process performed in step 402, the second test pattern may be substantially different than first test pattern 500.

In step 408, disk tester 102 measures the analog amplitudes of the second test pattern read in step 406. In step 410, disk tester 102 calculates an amplitude ratio based on the measured analog amplitudes of the second test pattern. When calculating the amplitude ratio, disk tester 102 may use a variety of methods including capturing digital data, capturing analog data, filtering the measured data, or other methods. When disk tester 102 calculates the amplitude ratio, the calculation may be performed on a per-track basis, a basis of downtrack position or a basis over time.

In step 412, disk tester 102 determines the quality of the erase process performed in step 402 based on the calculated amplitude ratio. In order to more fully understand steps 406-412 performed by disk tester 102, the steps will be described by way of examples.

Figure 6:
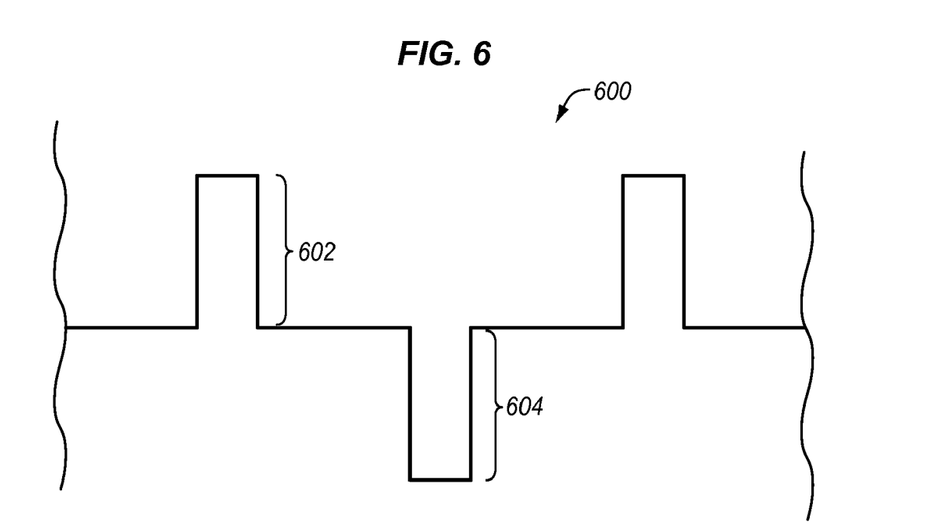
FIG. 6 is an illustration of a second test pattern of magnetization pulses read according to a step of the method of FIG. 4 in an exemplary embodiment of the invention.

FIG. 6 is an illustration of a second test pattern 600 of magnetization pulses read according to step 406 of method 400 in an exemplary embodiment of the invention. Second test pattern 600 is an example of a pattern which may be read by disk tester 102 when performing method 400. Second test pattern 600 has a positive amplitude 602 and a negative amplitude 604. Amplitudes 602 and 604 shown in second pattern 600 are substantially the same. After disk tester 102 measures amplitudes 602 and 604, disk tester 102 calculates an amplitude ratio of second test pattern 600. As amplitudes 602 and 604 are substantially the same, disk tester 102 calculates an amplitude ratio of about 1. Second test pattern 600, which is substantially the same as first test pattern 500, is indicative of alternating magnetic domains present in regions read by disk tester 102 (i.e., similar to region 202 of FIG. 2). Based on the amplitude ratio being about 1, disk tester 102 determines that the quality of the erase process performed in step 402 is high.

Figure 7:
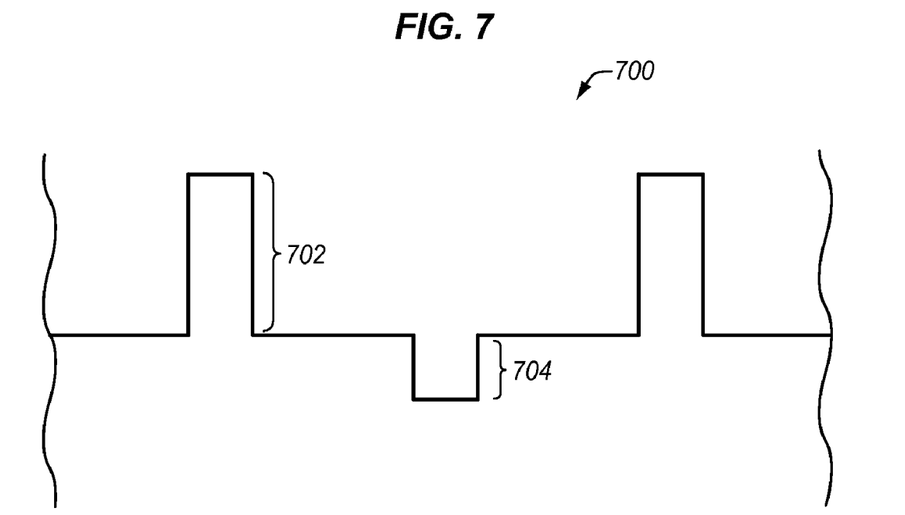
FIG. 7 is an illustration of a second test pattern of magnetization pulses read according to a step of the method of FIG. 4 in an exemplary embodiment of the invention.

FIG. 7 is an illustration of a second test pattern 700 of magnetization pulses read according to step 406 of method 400 in an exemplary embodiment of the invention. Second test pattern 700 has a positive amplitude 702 and a negative amplitude 704. Amplitudes 702 and 704 shown in second pattern 700 are not substantially the same. Specifically, positive amplitude 702 is about two times larger than negative amplitude 704. After disk tester 102 measures amplitudes 702 and 704, disk tester 102 calculates an amplitude ratio of second test pattern 700. As amplitude 702 is about two times larger than amplitude 704, disk tester 102 calculates an amplitude ratio of about 2. Second test pattern 700, which is not substantially the same as first test pattern 500, is indicative of non-alternating magnetic domains present in regions read by disk tester 102 (i.e., similar to regions 204 and 206 of FIG. 2). Specifically, second test pattern 700 may be indicative of a negative magnetic bias present in regions read by disk tester 102. Based on the amplitude ratio being about 2, disk tester 102 determines that the quality of the erase process performed in step 402 is low.

Figure 8:
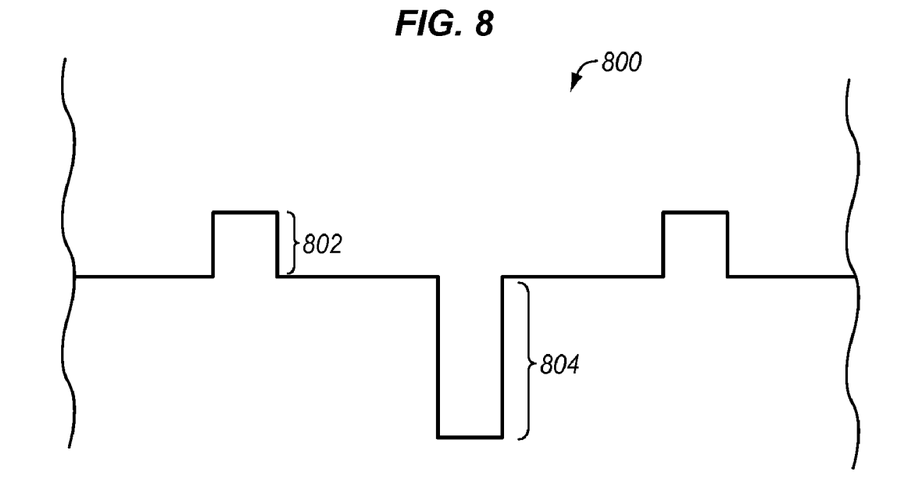
FIG. 8 is an illustration of a second test pattern of magnetization pulses read according to a step of the method of FIG. 4 in an exemplary embodiment of the invention.

FIG. 8 is an illustration of a second test pattern 800 of magnetization pulses read according to step 406 of method 400 in an exemplary embodiment of the invention. Second test pattern 800 has a positive amplitude 802 and a negative amplitude 804. Amplitudes 802 and 804 shown in second pattern 800 are not substantially the same. Specifically, positive amplitude 802 is about half the amplitude of negative amplitude 804. After disk tester 102 measures amplitudes 802 and 804, disk tester 102 calculates an amplitude ratio of second test pattern 800. As amplitude 802 is about half the amplitude of amplitude 804, disk tester 102 calculates an amplitude ratio of about 0.5. Second test pattern 800, which is not substantially the same as first test pattern 500, is indicative of non-alternating magnetic domains present in regions read by disk tester 102 (i.e., similar to regions 204 and 206 of FIG. 2). Specifically, second test pattern 800 may be indicative of a positive magnetic bias present in regions read by disk tester 102. Based on the amplitude ratio being about 0.5, disk tester 102 determines that the quality of the erase process performed in step 402 is low. In some cases the quality of the erase process may be determined based on the amplitude ratio being between about 0.3 and 3.

Figure 9:
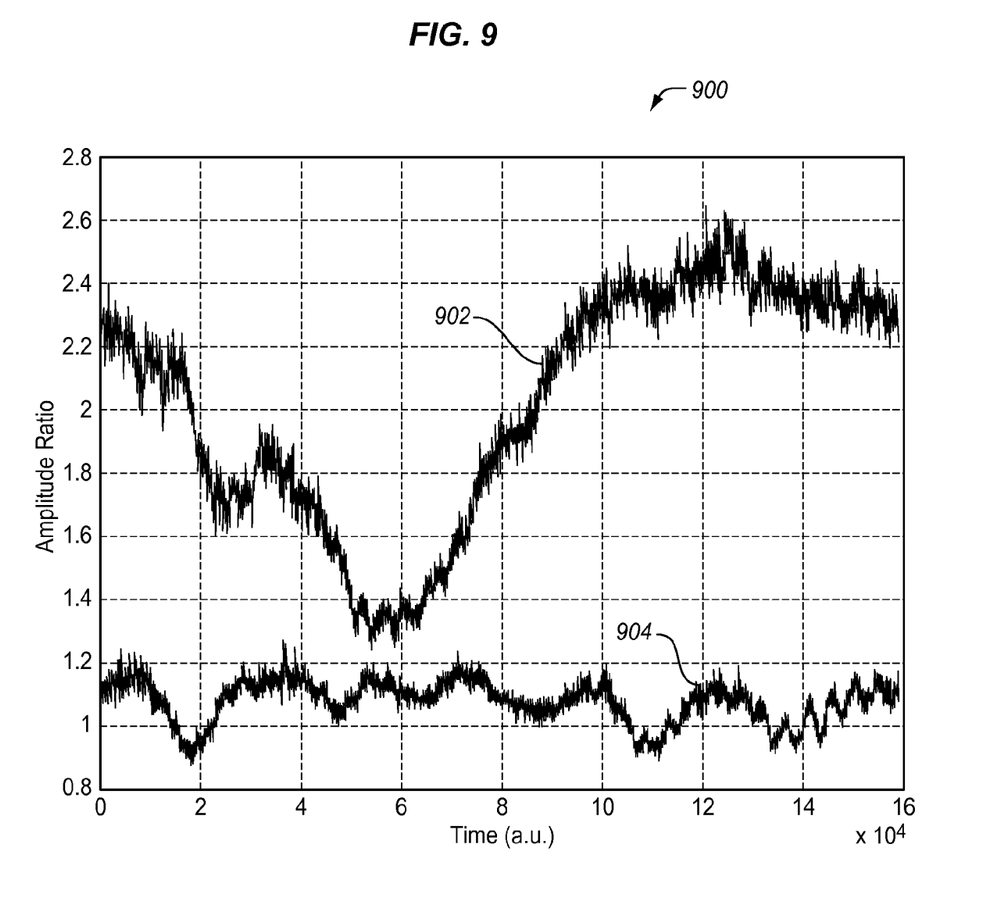
FIG. 9 is a graph illustrating an amplitude ratio over time calculated according to a step of the method of FIG. 4 in an exemplary embodiment of the invention.

FIG. 9 is a graph 900 illustrating amplitude ratios over time calculated by disk tester 102 in step 410 in an exemplary embodiment of the invention. Ratio 904 is indicative of a high quality erase process performed on PMR disk 106, because the amplitude ratio is approximately 1. Conversely ratio 902, which varies in magnitude from approximately 1.3 to 2.6, is indicative of a poor quality erase process performed on PMR disk 106, because the amplitude ratio varies from a desired value of 1.

Figure 10:
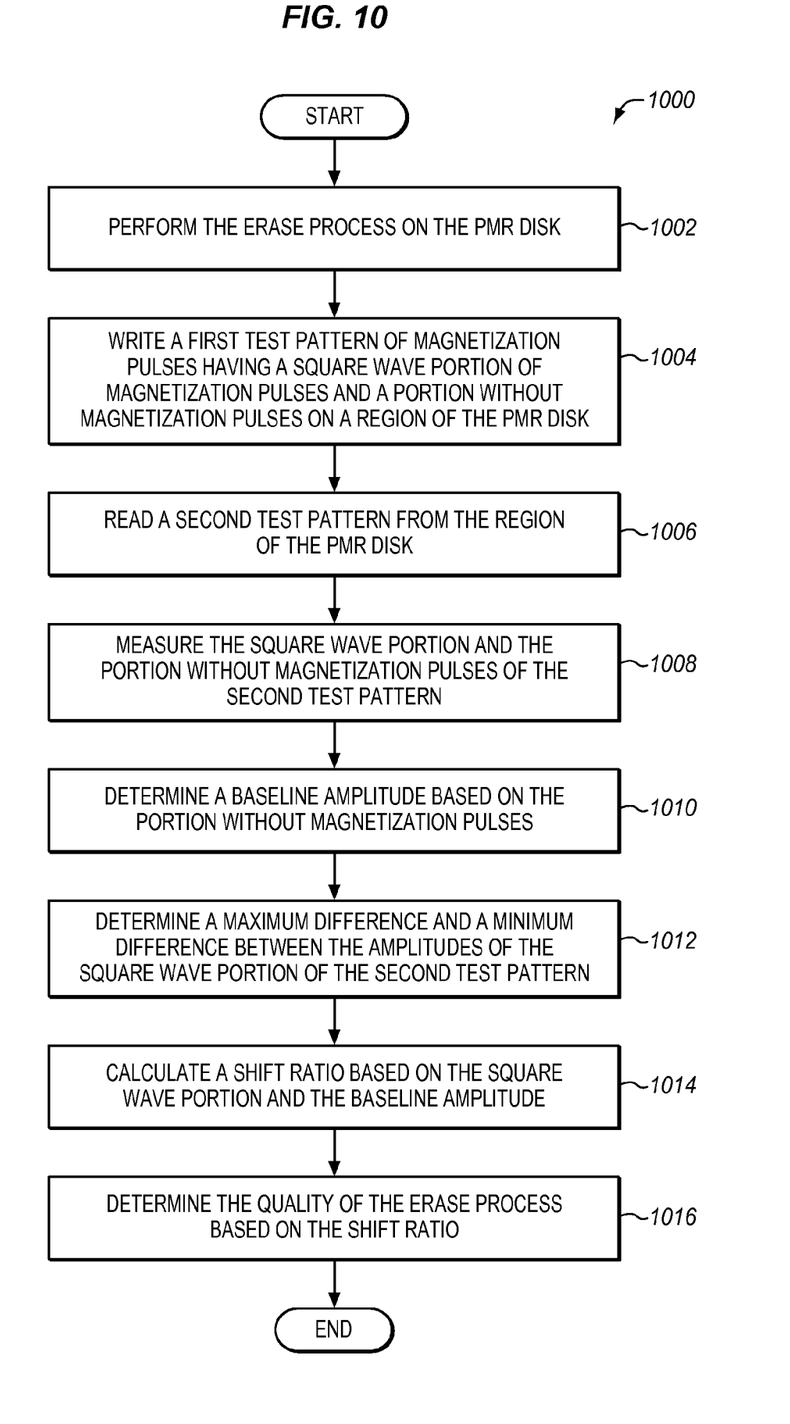
FIG. 10 is a flowchart illustrating a method of determining the quality of an erase process performed on a PMR disk in an exemplary embodiment of the invention.

FIG. 10 is a flowchart illustrating a method 1000 for determining the quality of an erase process performed on PMR disk 106 in an exemplary embodiment of the invention. The steps of method 1000 are not all inclusive and may include other steps not shown. For illustration purposes only, method 1000 will be described in reference to test system 100 (see FIG. 1).

Figure 11:
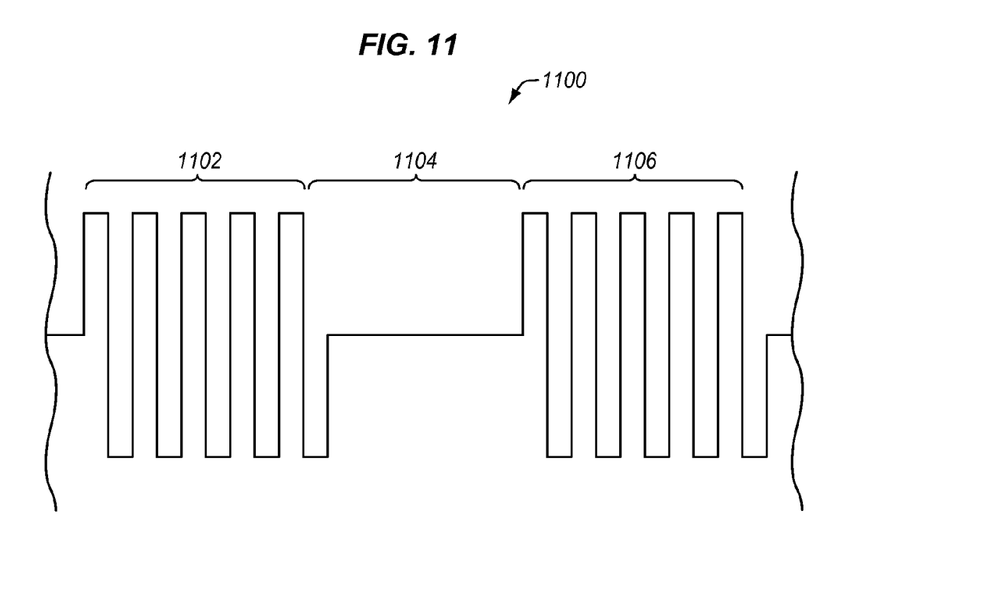
FIG. 11 is an illustration of a first square wave test pattern of magnetization pulses written according to a step of the method of FIG. 10 in an exemplary embodiment of the invention.

Step 1002 of method 1000 includes performing an erase process on PMR disk 106 before assembly into a hard disk drive. In step 1004, disk tester 102 writes a first test pattern of magnetization pulses on PMR disk 106. In writing the first test pattern, disk tester 102 writes a square wave portion of magnetization pulses and a portion without magnetization pulses. FIG. 11 is an illustration of a first test pattern 1100 of magnetization pulses written by disk tester 102. FIG. 11 may include any number of sequences of pattern 1100. First test pattern 1100 includes a square wave portion indicated by region 1102 and 1106, and a portion without magnetization pulses indicated by region 1104. In some cases the frequency of region 1102 may be about 400 megahertz. Region 1104 may also be, in some cases, approximately 400 nanoseconds in duration.

In step 1006, disk tester 102 reads PMR disk 106 to measure a second test pattern of magnetization pulses from the regions written by disk tester 102 in step 1004. The test second pattern read by disk tester 102 may include square wave portions of magnetization pulses and portions without any magnetization pulses. In step 1008, disk tester 102 measures the square wave portion of the second test pattern and the portion without magnetization pulses.

In step 1010, disk tester 102 determines a baseline amplitude based on the portion without magnetization pulses. In step 1012, disk tester 102 determines a maximum and minimum difference between amplitudes of the square wave portion and the baseline amplitude determined in step 1010. In step 1014, disk tester 102 calculates a shift ratio based on the square wave portion and the baseline amplitude. The shift ratio is based on an amount of shift in the square wave portion of the second test pattern as compared to the baseline amplitude.

In step 1016, disk tester 102 determines the quality of the erase process based on the shift ratio. When disk tester 102 calculates the shift ratio, the calculation may be performed on a per-track basis, a function of a downtrack position, over time, or some other means. In order to more fully understand steps 1006-1016 performed by disk tester 102, the steps will be described by way of examples.

Figure 12:
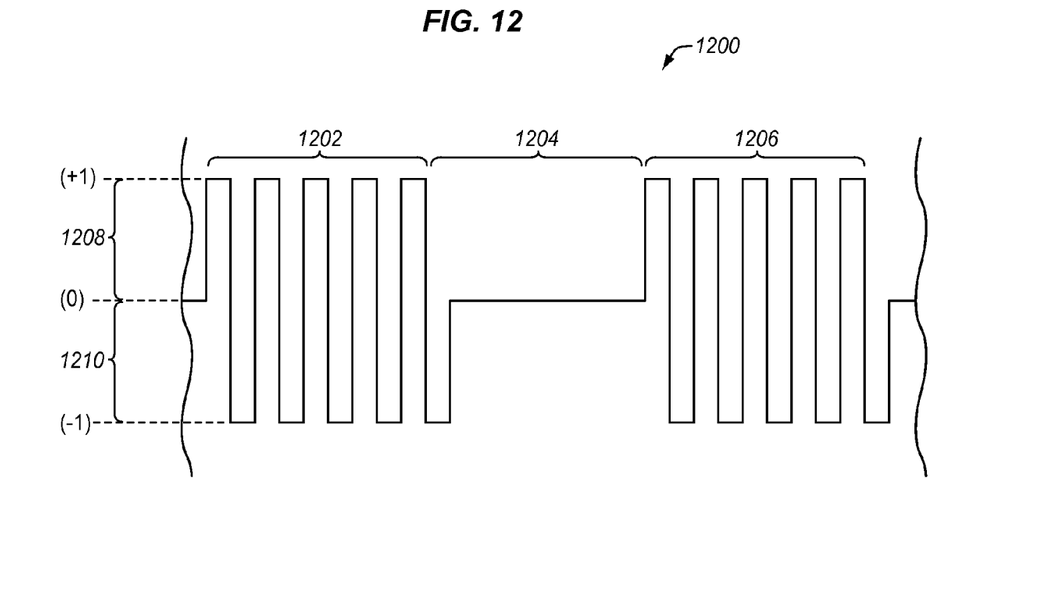
FIG. 12 is an illustration of a second test pattern of magnetization pulses read according to a step of the method of FIG. 10 in an exemplary embodiment of the invention.

FIG. 12 is an illustration of a second test pattern 1200 of magnetization pulses read according to step 1006 of method 1000 in an exemplary embodiment of the invention. Second test pattern 1200 is an example of a pattern which may be read by disk tester 102 when performing method 1000. Second test pattern 1200 has a positive amplitude 1208 and a negative amplitude 1210 within regions 1202 and 1206. Second test pattern 1200 has an amplitude of approximately zero in region 1204. Amplitudes 1208 and 1210 shown in second test pattern 1200 are substantially the same. After disk tester 102 measures regions 1202 and 1204, disk tester 102 determines a baseline amplitude based on region 1204, and a maximum difference and a minimum difference between amplitudes 1208 and 1210 and the baseline amplitude. In this example, the baseline amplitude is about zero and the maximum and minimum differences between amplitudes 1208 and 1210 and the baseline amplitude are about 1. Disk tester 102 then calculates a shift ratio of about 1/1. Second test pattern 1200, which is substantially the same as first test pattern 1100, is indicative of alternating magnetic domains present in regions read by disk tester 102 (i.e., similar to region 202 of FIG. 2). Based on the shift ratio being about 1, disk tester 102 determines that the quality of the erase process performed in step 1002 is high.

Figure 13:
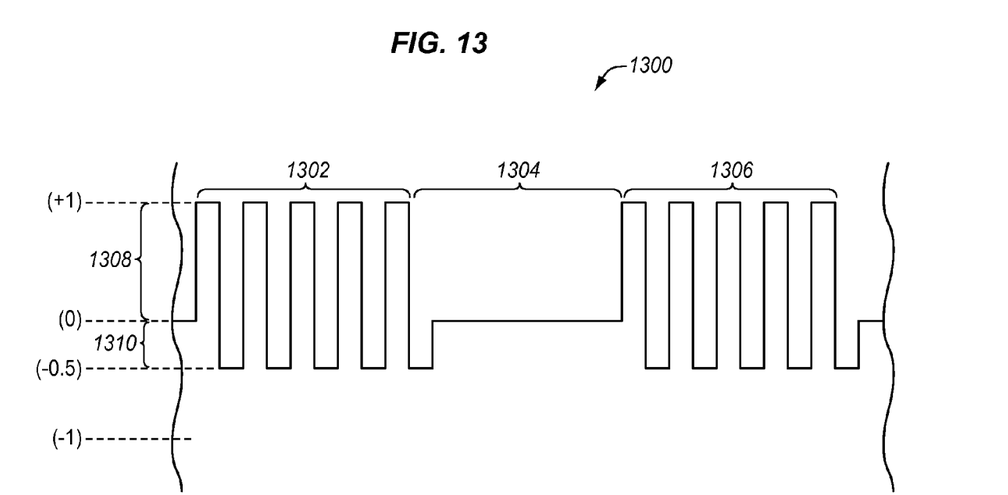
FIG. 13 is an illustration of a second test pattern of magnetization pulses read according to a step of the method of FIG. 10 in an exemplary embodiment of the invention.

FIG. 13 is an illustration of a second test pattern 1300 of magnetization pulses read according to step 1006 of method 1000 in an exemplary embodiment of the invention. Second test pattern 1300 has a positive amplitude 1308 and a negative amplitude 1310 within regions 1302 and 1306. Second test pattern 1300 has an amplitude of approximately zero in region 1304. Amplitude 1308 is about twice that of amplitude 1310. After disk tester 102 measures regions 1302 and 1304, disk tester 102 determines a baseline amplitude based on region 1304, and a maximum difference and a minimum difference between amplitudes 1308 and 1310 and the baseline amplitude. In this example, the baseline amplitude is about zero. The maximum and the minimum differences between amplitudes 1308 and 1310 and the baseline amplitude are about 1 and 0.5, respectively. Disk tester 102 then calculates a shift ratio of about 1/0.5. Second test pattern 1300, which is not substantially the same as first test pattern 1100, is indicative of non-alternating magnetic domains present in regions read by disk tester 102 (i.e., similar to regions 204 and 206 of FIG. 2). Based on the shift ratio being about 2, disk tester 102 determines that the quality of the erase process performed in step 1002 is low. Second test pattern 1300 may be indicative of a negative magnetic bias on regions read by disk tester 102 while performing method 1000.

Figure 14:
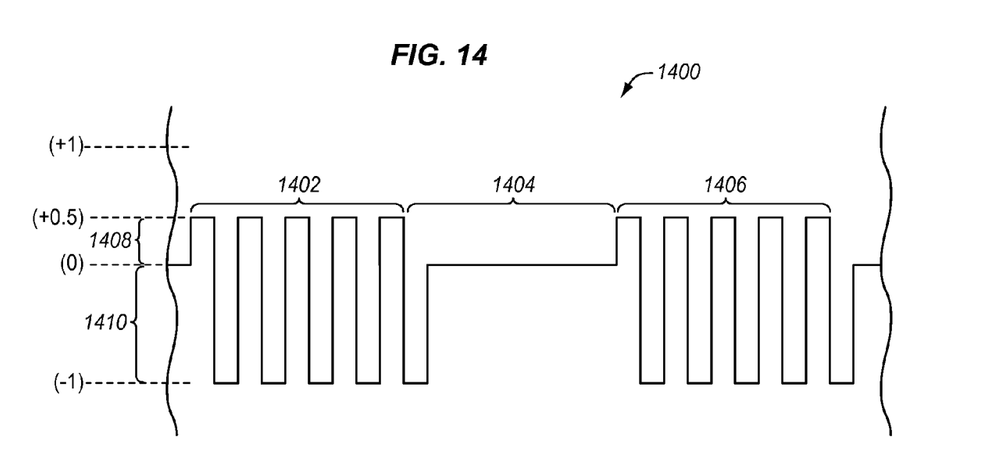
FIG. 14 is an illustration of a second test pattern of magnetization pulses read according to a step of the method of FIG. 10 in an exemplary embodiment of the invention.

FIG. 14 is an illustration of a second test pattern 1400 of magnetization pulses read according to step 1006 of method 1000 in an exemplary embodiment of the invention. Second test pattern 1400 has a positive amplitude 1408 and a negative amplitude 1410 within regions 1402 and 1406. Second test pattern 1400 has an amplitude of approximately zero in region 1404. Amplitude 1408 is about half that of amplitude 1410. After disk tester 102 measures regions 1402 and 1404, disk tester 102 determines a baseline amplitude based on region 1404, and a maximum difference and a minimum difference between amplitudes 1408 and 1410 and the baseline amplitude. In this example, the baseline amplitude is about zero. The maximum and the minimum differences between amplitudes 1408 and 1410 and the baseline amplitude are about 0.5 and 1, respectively. Disk tester 102 then calculates a shift ratio of about 0.5/1. Second test pattern 1400, which is not substantially the same as first test pattern 1100, is indicative of non-alternating magnetic domains present in regions read by disk tester 102 (i.e., similar to region 204 and 206 of FIG. 2). Based on the shift ratio being about 0.5, disk tester 102 determines that the quality of the erase process performed in step 1002 is low. Second test pattern 1400 may be indicative of a positive magnetic bias on regions read by disk tester 102 while performing method 1000. In some cases the quality of the erase process may be determined based on the shift ratio being between about 1 and 30.

Figure 15:
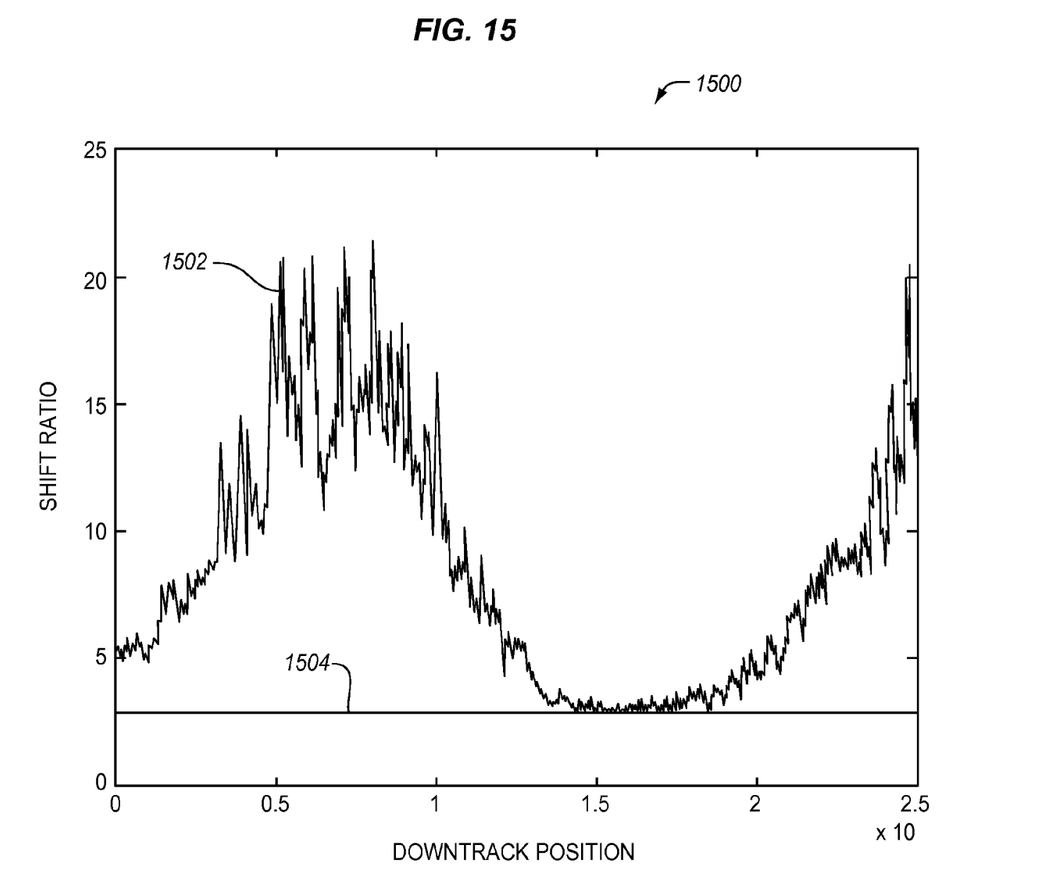
FIG. 15 is a graph illustrating a shift ratio to downtrack position calculated according to a step of the method of FIG. 10 in an exemplary embodiment of the invention.

FIG. 15 is an illustration 1500 of shift ratios to downtrack position calculated according to step 1014 of method 1000 in an exemplary embodiment of the invention. Shift ratio 1504 is indicative of a high quality erase process performed on PMR disk 106, as indicated by a shift ratio of approximately 1. Conversely shift ratio 1502, which varies in magnitude from approximately 1 to 30, is indicative of a poor quality erase process performed on PMR disk 106, as indicated by a shift ratio which deviates from the preferred value of approximately 1.

Although specific embodiments were described herein, the scope of the invention is not limited to those specific embodiments. The scope of the invention is defined by the following claims and any equivalents thereof.

We claim:

1. A method of determining a quality of an erase process for a perpendicular magnetic recording (PMR) disk before assembly into a hard disk drive, the method comprising:
    performing the erase process on the PMR disk;
    writing a first test pattern of magnetization pulses comprising a square wave portion of magnetization pulses and a portion without magnetization pulses on at least one region of the PMR disk;
    reading the at least one region of the PMR disk previously written with the first test pattern to identify a second test pattern of magnetization pulses;
    analyzing the second test pattern of magnetization pulses in relation to the first test pattern by measuring a baseline amplitude based on the portion without magnetization pulses, calculating a maximum difference and a minimum difference between amplitudes of the square wave portion of magnetization pulses, calculating a shift ratio based on the maximum difference and the minimum difference between the amplitudes of the square wave portion of magnetization pulses and the baseline amplitude; and determining the quality of the erase process based on the shift ratio being between 1 and 30.

2. The method of claim 1 wherein:

analyzing the second test pattern further comprises measuring analog amplitudes of the second test pattern of magnetization pulses and calculating an amplitude ratio based on the analog amplitudes of the second test pattern of magnetization pulses; and determining the quality of the erase process further comprises determining the quality of the erase process based on the amplitude ratio being between about 0.3 and 3.0.

3. The method of claim 2 wherein writing the first test pattern of magnetization pulses further comprises:

writing an alternating pattern of positive and negative magnetization pulses having a pulse width of about 50 nanoseconds and a period of about 300 nanoseconds.

4. The method of claim 2 wherein determining the quality of the erase process further comprises:

determining the quality of the erase process based on at least one of a per-track basis, a downtrack basis, and an over time basis.

5. The method of claim 1 wherein the square wave portion of magnetization pulses has a frequency of about 400 megahertz and the portion without magnetization pulses has a duration of about 400 nanoseconds.

6. The method of claim 1 wherein determining the quality of the erase process further comprises:

determining the quality of the erase process based on at least one of a per-track basis, a downtrack basis, and an over time basis.

7. A test system for determining a quality of an erase process for a perpendicular magnetic recording (PMR) disk before assembly into a hard disk drive, the test system comprising:

a spin stand operable to receive a PMR disk erased by the erase process; and a disk tester operable to:

write a first test pattern of magnetization pulses comprising a square wave portion of magnetization pulses and a portion without magnetization pulse on at least one region of the PMR disk;

read the at least one region of the PMR disk previously written with the first test pattern to identify a second test pattern of magnetization pulses;

analyze the second test pattern of magnetization pulses in relation to the first test pattern to:

determine a baseline amplitude based on the portion without magnetization pulses;

determine a maximum difference and a minimum difference between amplitudes of the square wave portion of the second pattern of magnetization pulses; and calculate a shift ratio based on the maximum difference and the minimum difference between the amplitudes of the square wave portion of magnetization pulses and the baseline amplitude; and determine the quality of the erase process based on the shift ratio being between 1 and 30.

8. The test system of claim 7 wherein the disk tester is further operable to:

measure analog amplitudes of the second test pattern of magnetization pulses;

calculate an amplitude ratio based on the analog amplitudes of the second test pattern of magnetization pulses; and determine the quality of the erase process based on the amplitude ratio being between about 0.3 and 3.0.

9. The test system of claim 8 wherein the disk tester is further operable to:

write a an alternating pattern of positive and negative magnetization pulses having a pulse width of about 50 nanoseconds and a period of about 300 nanoseconds.

10. The test system of claim 8 wherein the disk tester is further operable to:

determine the quality of the erase process based on at least one of a per-track basis, a downtrack basis, and an over time basis.

11. The test system of claim 7 wherein the square wave portion of magnetization pulses has a frequency of about 400 megahertz and the portion without magnetization pulses has a duration of about 400 nanoseconds.

12. The test system of claim 7 wherein the disk tester is further operable to:

determine the quality of the erase process based on at least one of a per-track basis, a downtrack basis, and an over time basis.

* * * * *